(12) United States Patent
Dufford

(10) Patent No.: US 8,768,584 B2
(45) Date of Patent: Jul. 1, 2014

(54) DRIVE FORCE CONTROL FOR VEHICLE

(75) Inventor: Mohammad E. Dufford, Los Angeles, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 163 days.

(21) Appl. No.: 13/414,638

(22) Filed: Mar. 7, 2012

(65) Prior Publication Data
US 2013/0238203 A1    Sep. 12, 2013

(51) Int. Cl.
*B60W 20/00*    (2006.01)

(52) U.S. Cl.
USPC .............................. 701/54; 477/120; 477/15

(58) Field of Classification Search
USPC ........ 701/54, 93, 96, 301, 123, 110; 477/120, 477/15; 180/65.265, 65.21; 340/435, 903, 340/439; 123/395, 319, 339.14, 436
See application file for complete search history.

(56) References Cited

U.S. PATENT DOCUMENTS

| | | | |
|---|---|---|---|
| 6,246,951 B1 * | 6/2001 | Robichaux et al. | 701/110 |
| 6,350,217 B1 | 2/2002 | Unterforsthuber | |
| 6,367,447 B1 * | 4/2002 | Palansky et al. | 123/361 |
| 6,565,482 B2 | 5/2003 | Kobayashi et al. | |
| 6,953,023 B2 | 10/2005 | Persson et al. | |
| 7,954,579 B2 | 6/2011 | Rodriguez et al. | |
| 7,969,291 B2 | 6/2011 | Mangum et al. | |
| 8,007,401 B2 | 8/2011 | Saito et al. | |
| 2007/0255478 A1 * | 11/2007 | Wakashiro et al. | 701/93 |
| 2010/0042280 A1 | 2/2010 | Cominetti | |
| 2010/0191403 A1 | 7/2010 | Krause | |
| 2011/0054768 A1 | 3/2011 | Sullivan | |
| 2011/0125294 A1 | 5/2011 | Yu et al. | |
| 2011/0130901 A1 | 6/2011 | Mori et al. | |
| 2011/0166774 A1 | 7/2011 | Schunder | |
| 2011/0213516 A1 | 9/2011 | Choi et al. | |

FOREIGN PATENT DOCUMENTS

| | | |
|---|---|---|
| EP | 1113943 | 11/2004 |
| JP | 2007296976 | 11/2007 |

* cited by examiner

*Primary Examiner* — Marthe Marc-Coleman
(74) *Attorney, Agent, or Firm* — Snell & Wilmer LLP

(57) ABSTRACT

Systems, methods and controllers for facilitating or providing a more efficient operation of a vehicle are disclosed. An accelerator input is detected from an accelerator sensor and it is determined whether the accelerator input is within a first range of values or within a second range of values. If it is determined that the accelerator input is within the first range of values, an engine is controlled to provide limited or no power to a transmission. If it is determined that the accelerator input is within the second range of values, the engine is controlled to provide a substantially constant power to the transmission.

20 Claims, 11 Drawing Sheets

DRIVE FORCE CONTROL FOR VEHICLE

FIELD

The present disclosure relates to controlling the operation of a vehicle, and more particularly, to facilitating or providing a more efficient operation of the vehicle.

BACKGROUND

As fuel costs and concerns of air pollution increase, some drivers have begun to practice driving techniques to improve the fuel economy of their vehicles. Such fuel-saving driving techniques are generally referred to as hypermile driving and can include driving techniques such as using light accelerations, smooth decelerations, cruise control or turning off the engine instead of idling.

One hypermile driving technique includes what is referred to as pulse-and-glide driving where the driver alternates between accelerating in a pulse phase and coasting with minimal power in a glide phase. Fuel economy with pulse-and-glide driving is typically improved over a base fuel-saving driving style of using light accelerations, smooth decelerations and attempting to maintain a relatively constant speed. The improved fuel economy associated with pulse-and-glide driving is primarily due to the reduced amount of fuel required to coast in the glide phase.

SUMMARY

In vehicles having a system power indicator or a fuel economy indicator, the above described pulse-and-glide driving can be improved by accelerating in the pulse phase at a vehicle power which is relatively efficient in terms of fuel economy. In addition, the above described pulse-and-glide driving can be further improved by substantially maintaining the relatively efficient power throughout the pulse phase. However, such control would require precise control of an accelerator pedal. In particular, a driver would need to move the accelerator pedal to a specific angle to obtain and maintain the relatively efficient power while looking at a system power or fuel economy indicator.

In view of the foregoing, one embodiment of the present disclosure describes a drive force system for facilitating a more efficient operation of a vehicle. The drive force system includes an engine configured to provide power to move the vehicle and a transmission operatively coupled to the engine. An accelerator sensor is configured to detect an accelerator input and a controller is connected to the accelerator sensor and the engine.

According to one aspect of this embodiment, the controller is configured to receive the accelerator input and control the engine to provide limited or no power to the transmission when the accelerator input is within a first range of values. On the other hand, if the accelerator input is within a second range of values, the engine is controlled to provide a substantially constant power to the transmission.

By using the first range of values in controlling the engine, the accelerator input can vary while maintaining either a little or no power state in a glide phase. Similarly, by using the second range of values, the accelerator input can vary while maintaining a substantially constant power, thereby reducing the need for a driver to precisely control an accelerator.

According to one embodiment, the substantially constant power provided by the engine corresponds to a relatively efficient operation point for the vehicle or the engine. In a further embodiment, the drive force system includes an internal combustion engine and the substantially constant power provided by the engine corresponds to a relatively efficient region in a brake specific fuel consumption (BSFC) map for the internal combustion engine.

According to another embodiment, a method is described for providing a more efficient operation of a vehicle. An accelerator input is detected from an accelerator sensor and it is determined whether the accelerator input is within a first range of values or within a second range of values. If it is determined that the accelerator input is within the first range of values, an engine is controlled to provide limited or no power to a transmission. If it is determined that the accelerator input is within the second range of values, the engine is controlled to provide a substantially constant power to the transmission.

According to yet another embodiment, a controller includes a computer-readable memory and a processor configured to execute computer-executable process steps stored in the memory. The process steps include receiving an accelerator input from an accelerator sensor and determining whether the accelerator input is within a first range of values or within a second range of values. An engine is controlled to provide limited or no power to a transmission when it is determined that the accelerator input is within the first range of values. On the other hand, when it is determined that the accelerator input is within the second range of values, the engine is controlled to provide a substantially constant power to the transmission.

BRIEF DESCRIPTION OF THE DRAWINGS

The features and advantages of the embodiments of the present disclosure will become more apparent from the detailed description set forth below when taken in conjunction with the drawings. Naturally, the drawings and their associated descriptions illustrate example arrangements within the scope of the claims and do not limit the scope of the claims. Reference numbers are reused throughout the drawings to indicate correspondence between referenced elements.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
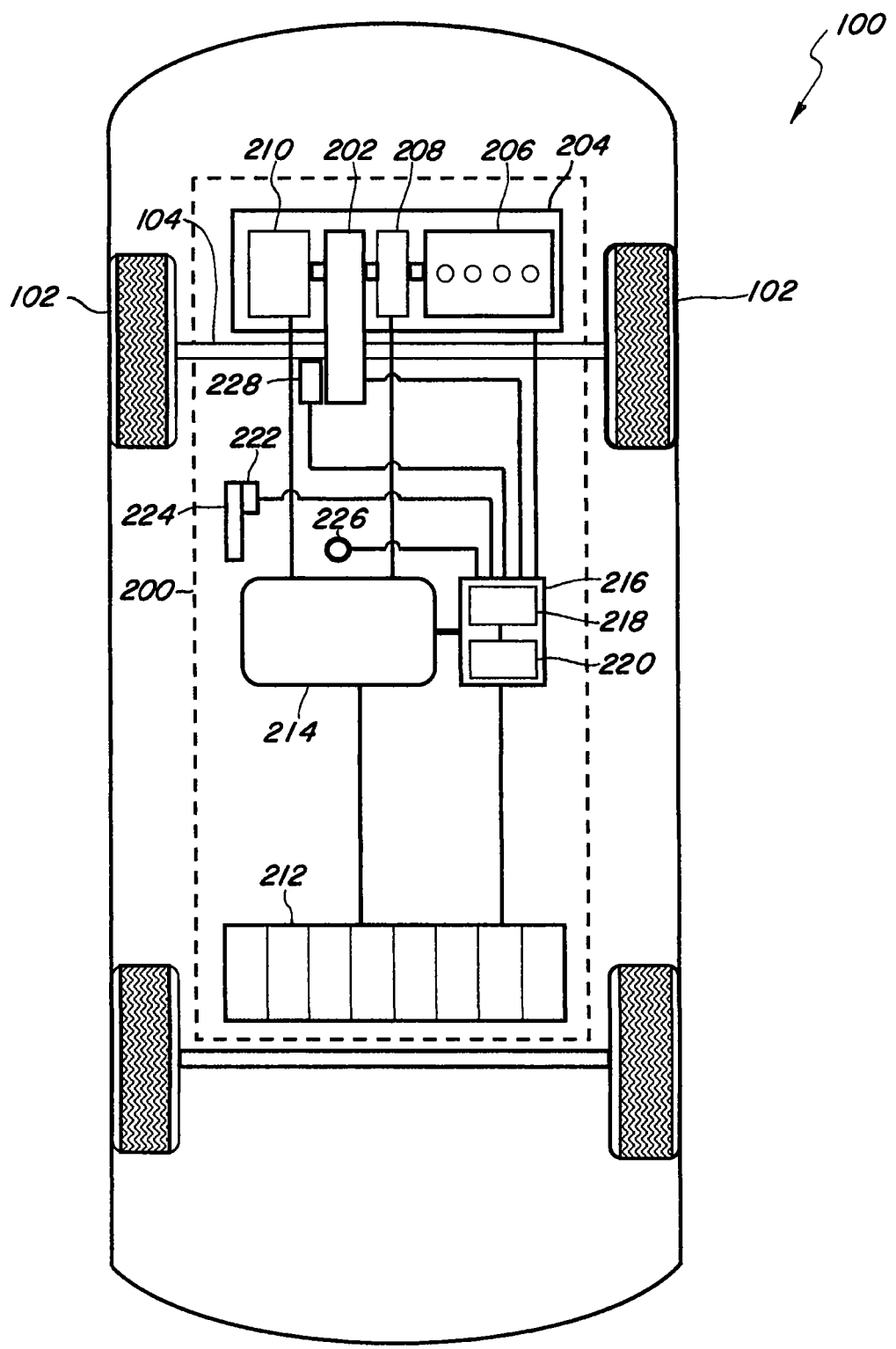
FIG. 1 depicts a schematic of a vehicle according to an embodiment of the present invention.

FIG. 1 depicts a simplified schematic of a vehicle 100 which includes wheels 102, an axle 104 and a drive force system 200. In the example embodiment of FIG. 1, the vehicle 100 is a passenger automobile or vehicle. As will be appreciated by those of ordinary skill in the art, the present invention is not limited to passenger automobiles. Accordingly, the locations and quantities of the components shown in FIG. 1 can vary without departing from the spirit or scope of the present invention. For example, in alternative embodiments, the vehicle 100 can be a different type of vehicle such as a bus or a train.

As shown in FIG. 1, the wheels 102 are coupled to the axle 104, which in turn, is coupled to a transmission 202. Mechanical power is delivered from the drive force system 200 to the transmission 202 for moving the vehicle 100. The drive force system 200 includes the transmission 202, an engine 204, a battery unit 212, an inverter box 214, a controller 216, an accelerator sensor 222, an accelerator 224, a drive mode selector 226, and a speed sensor 228.

In the example embodiment of FIG. 1, the vehicle 100 is a hybrid vehicle using two different power sources to move the vehicle 100. More specifically, the engine 204 includes an internal combustion engine 206 and electric motors 208 and 210 to provide power to move the vehicle 100. As will be appreciated by those of ordinary skill in the art, different power source arrangements in both quantity and type of power source are possible without departing from the spirit and scope of the present invention. For example, in alternative embodiments, the engine 206 may include only an internal combustion engine, a fuel cell, an electric motor, or various combinations of these power sources, such as one internal combustion engine and one electric motor.

In FIG. 1, the electric motors 208 and 210 serve as motors in a drive mode and serve as generators in a regeneration mode. More specifically, the electric motors 208 and 210 operate as motors by converting electrical power into mechanical power in a drive mode, but operate as generators by converting mechanical power into electrical power in a regeneration mode. The electrical power delivered to or from the electric motors 208 and 210 passes through the inverter box 214, which is connected to the battery unit 212. The inverter box 214 can include various electrical components, such as a boost converter and an inverter for modifying the transmitted electrical power. The inverter box 214 may also include a motor controller for adjusting the electrical power according to control signals sent from the controller 216. For its part, the battery box 212 includes components such as a main battery for storing electrical power and a battery cooling fan.

The controller 216 includes the processor 218 and the memory 220. The processor 218 can be implemented using one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof. The memory 220 is a computer-readable memory and can include, for example, a non-volatile solid-state memory such as NAND flash.

In the example embodiment of FIG. 1, the controller 216 is connected through electrical wiring to the transmission 202, the engine 204, the battery unit 212, the inverter box 214, the accelerator sensor 222, the driving mode selector 226, and the speed sensor 228. Alternatively, the connections between any of the foregoing components of the drive force system 200 and the controller 216 may be through other connection types utilizing, for example, wireless or optical signals.

The accelerator 224 is an accelerator pedal which can be positioned by a driver of the vehicle 100 to adjust the power and the torque provided by the engine 204 to the transmission 202. The accelerator sensor 222 is a sensor, such as a potentiometer, which detects a position of the accelerator pedal 224. Alternatively, the accelerator sensor 222 can include other types of sensors for detecting or measuring a position of the accelerator 224, such as an optical sensor.

In further alternative embodiments, the accelerator 224 can be omitted where the accelerator sensor 222 acts as a direct interface with a driver or computer system controlling the vehicle 100. For example, in such embodiments, the accelerator sensor 222 can be a push button or other type of driver interface device.

The speed sensor 228 is mounted to an output shaft of the transmission 202 and detects the rotation of the output shaft of the transmission 202 as magnetic pulses. The magnetic pulses form a speed input which is converted into a vehicle speed by the controller 216.

In operation, the accelerator sensor 222 detects a position of the accelerator 224 as an accelerator input, which is accepted by the controller 216. In addition, the controller 216 accepts a speed input from the speed sensor 228, and controls the engine 204 based on the accepted speed and accelerator inputs in accordance with a drive mode input received from the drive mode selector 226. More specifically, control signals are sent from the controller 216 to the engine 204 and the inverter box 214 to adjust the torque and power provided by the engine 204 to the transmission 202 based on accelerator tuning maps stored in the memory 220. The accelerator tuning maps comprise data correlating the accepted accelerator input and the speed input for different driving modes selected by the drive mode selector 226.

Figure 2A:
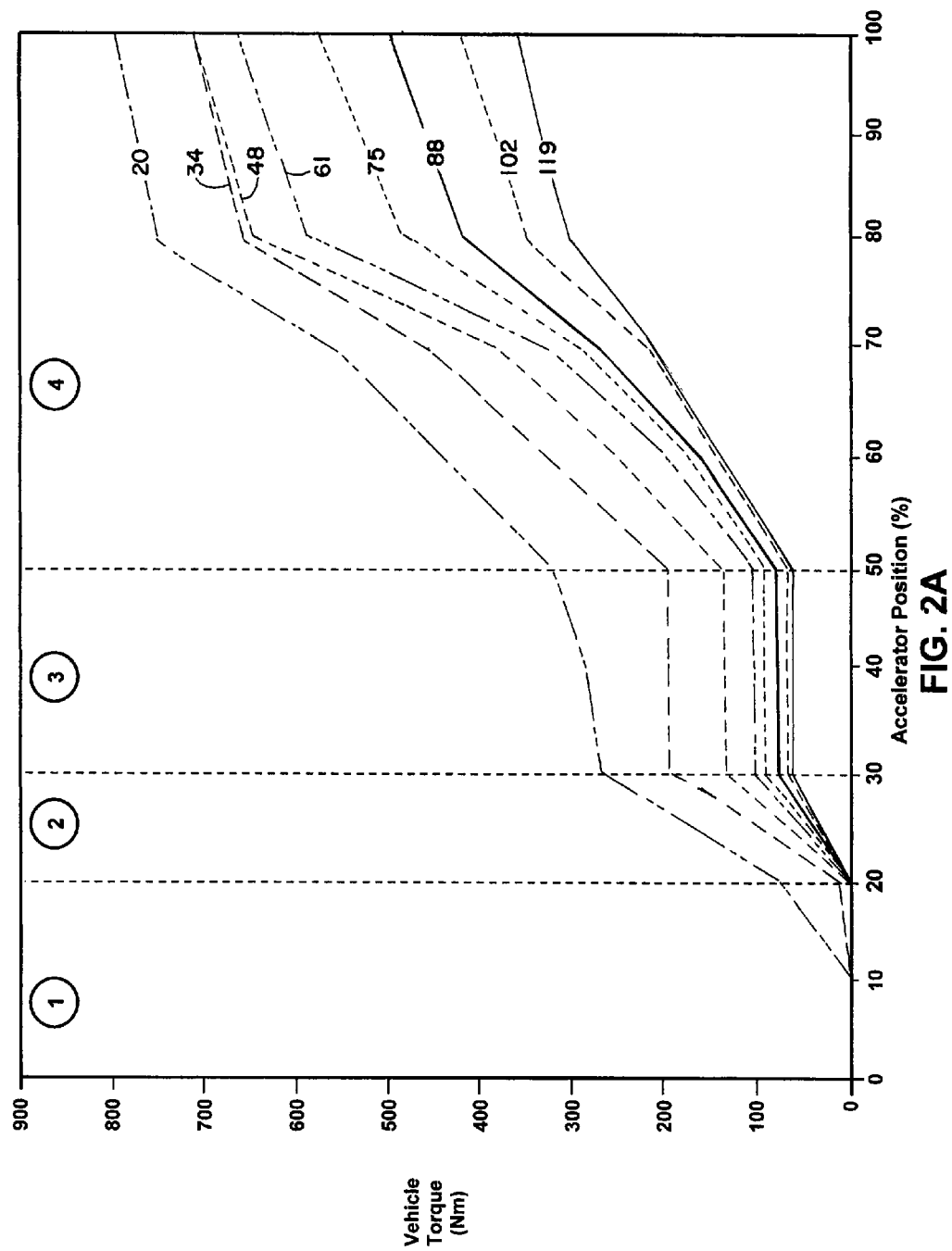
FIG. 2A is an accelerator tuning map for vehicle torque according to an embodiment of the present invention.

FIG. 2A illustrates one accelerator tuning map for the vehicle 100 when a hypermile drive force (HMDF) mode has been selected via the drive mode selector 226. More specifically, FIG. 2A illustrates relationships between a target vehicle torque to be generated by the wheels 102 of the vehicle 100 in relation to an accelerator position of the accelerator 224 for different vehicle speeds detected by the speed sensor 228. In this embodiment, the accelerator position detected by the accelerator sensor 222 is represented as a percentage of a farthest pedal position, which is represented by 100% on the x-axis of the accelerator tuning map of FIG. 2A.

Each line in the accelerator tuning map of FIG. 2A represents a target vehicle torque over a range of positions of the accelerator 224 at particular speeds of the vehicle 100. The vehicle speeds shown in FIG. 2A, such as 20 kph or 34 kph, are merely for purposes of illustration. As understood by those of ordinary skill in the art, the present invention is not limited to the particular speeds shown in FIG. 2A. For example, the memory 220 of the controller 216 can store data relating to the target vehicle torques and the accelerator positions for hundreds of different vehicle speeds.

In FIG. 2A, the values for the accelerator position and the target vehicle torque for each vehicle speed are stored as data in the memory 220 for access by the processor 218 in controlling the engine 204. In more detail, when an HMDF driving mode has been enabled via the driving mode selector 226, the controller 216 accepts an accelerator input from the accelerator sensor 222 indicating an accelerator position. The controller 216 also accepts a speed input from the speed sensor 228 indicating a vehicle speed. The processor 218 or the controller 216 correlates the vehicle speed and the accelerator position using the stored accelerator tuning map to determine a target vehicle torque along the vehicle torque lines shown in FIG. 2A. The target vehicle torque is then used by the processor 218 to control the engine 204. More specifically, the processor 218 uses the speed sensor 228 and current measurements from the electric motors 208 and 210 to estimate an actual torque used by the processor 218 to control the engine 204 to deliver the target vehicle torque.

The tuning map of FIG. 2A is divided into four zones which are designated at the top of the tuning map as zones 1, 2, 3 and 4. In the present embodiment, each of these zones is defined by a range of accelerator pedal positions and corresponds to a glide, transition, pulse, or high power acceleration zone. In more detail, zone 1 is a glide zone defined between accelerator pedal positions from 0% to 20%, zone 2 is a transition zone defined between accelerator pedal positions from 21% to 29%, zone 3 is a pulse zone defined between accelerator pedal positions from 30% to 50%, and zone 4 is a high power acceleration zone defined beyond an accelerator pedal position of 50%. In alternative embodiments, the foregoing accelerator pedal positions for the different zones can vary. For example, in an alternative embodiment, glide zone 1 can be defined between accelerator pedal positions from 0% to 25% and pulse zone 3 can be defined between accelerator pedal positions from 35% to 55%.

In the example of FIG. 2A, glide zone 1 and pulse zone 3 are defined within a large enough range of accelerator pedal positions such that a driver can remain in glide zone 1 or pulse zone 3 without requiring precise control of the accelerator 224.

As shown in FIG. 2A, when the accelerator sensor 222 detects the position of the accelerator 224 to be within a range from 0% to 20%, the controller 216 controls the engine 204 to provide little or no torque to the transmission 202. On the other hand, when the accelerator sensor 222 detects the position of the accelerator 224 to be within a range from 30% to 50% of a farthest pedal position, the controller 216 controls the engine 204 to provide a substantially constant torque to the transmission 202 for a given vehicle speed, as indicated by the relatively flat vehicle torque lines in pulse zone 3.

Between glide zone 1 and pulse zone 3, transition zone 2 provides an increase in torque to reach the substantially constant vehicle torques shown in pulse zone 3. The substantially constant vehicle torques in pulse zone 3 generally range from approximately 50 Nm at 119 kph to approximately 280 Nm at 20 kph and correspond to relatively efficient operation points for the vehicle 100. One example of a relatively efficient operation point for the vehicle 100 considers a ratio of a total power used by the drive force system 200 to a vehicle power generated by the wheels 102 at a particular operating point. Other examples include operation points that consider the energy losses from conversion and transfer between the electrical and mechanical components and the battery unit 212, or operation points that consider the aging effects of the battery unit 212 or the engine 204.

Alternatively, and as discussed in more detail below with reference to FIG. 4, the torque lines for pulse zone 3 in FIG. 2A can also correspond to relatively efficient operation points for the engine 204. In one embodiment, the torque lines for pulse zone 3 can correspond to a relatively efficient region in a brake specific fuel consumption (BSFC) map for the internal combustion engine 206 of the engine 204.

By providing a torque which corresponds to a relatively efficient operation point of the vehicle 100 or the engine 204, it is ordinarily possible to further improve the fuel economy of the vehicle 100 beyond a fuel economy obtained with a basic fuel-saving driving style of light accelerations, smooth decelerations and maintaining relatively constant speeds.

With reference to FIG. 2A, when the detected position of the accelerator 224 exceeds 50% of a farthest pedal position, the controller 216 controls the engine 204 to provide torque to the transmission 202 that is proportional to the detected accelerator position. This zone is depicted in FIG. 2A as high power acceleration zone 4. When the position of the accelerator 224 is detected in this zone, greater torque is provided to accommodate for rapid accelerations or emergency maneuvers.

In alternative embodiments, high power acceleration zone 4 can be removed. In such embodiments, when the detected position of the accelerator 224 exceeds 50% of a farthest pedal position, the controller 216 disables the HMDF driving mode and an accelerator tuning map different from FIG. 2A is used.

Figure 2B:
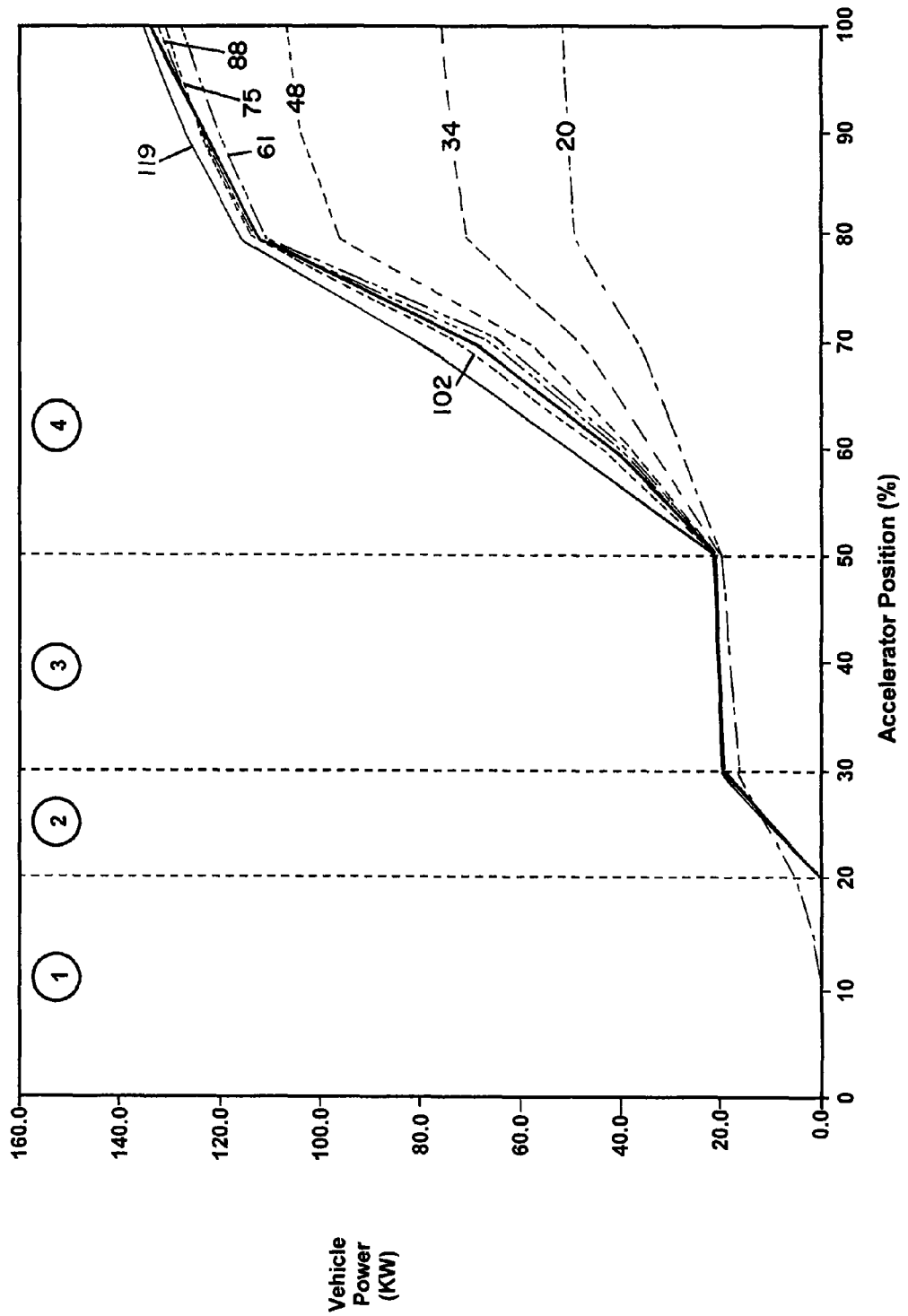
FIG. 2B is an accelerator tuning map for vehicle power according to an embodiment of the present invention.

Instead of controlling the engine 204 using a target vehicle torque, the controller 216 can alternatively control the engine 204 using a target power. FIG. 2B illustrates an accelerator tuning map for such control by relating a target vehicle power to be generated by the wheels 102 and a detected position of the accelerator 224 for different vehicle speeds. As with controlling to a target vehicle torque, the processor 218 uses the speed sensor 228 and current measurements from the electric motors 208 and 210 to estimate an actual power used by the processor 218 to control the engine 204 to deliver the target vehicle power.

The tuning map of FIG. 2B is divided into glide zone 1, transition zone 2, pulse zone 3, and high power acceleration zone 4. As noted with reference to FIG. 2A, the accelerator pedal positions defining these zones are merely for illustration. In alternative embodiments, the accelerator pedal positions can differ from FIGS. 2A and 2B. In addition, the vehicle speeds shown in FIG. 2B are merely for purposes of illustration and do not limit the present invention to any particular vehicle speeds or range of vehicle speeds.

As shown in FIG. 2B, the controller 216 controls the engine 204 to provide limited or no power to the transmission 202 in glide zone 1. In pulse zone 3, the controller 216 controls the engine 204 to provide a substantially constant power to the transmission 202. Between glide zone 1 and pulse zone 3, the vehicle power increases in zone 2 to reach the substantially constant vehicle power shown in pulse zone 3. The substantially constant vehicle power shown in pulse zone 3 is approximately 20 kW for the speeds shown in FIG. 2B and corresponds to a relatively efficient operation point for the vehicle 100. As understood by those of ordinary skill in the art, the efficiency of operating at a particular vehicle power will vary depending upon the characteristics of the vehicle 100.

As discussed in more detail below with reference to FIG. 4, the vehicle power lines for pulse zone 3 can correspond to relatively efficient operation points for the engine 204. In one example embodiment, the vehicle power lines in pulse zone 3 of the accelerator tuning map correspond to a relatively efficient region in a BSFC map for the internal combustion engine 206 of the engine 204.

With reference to FIG. 2B, when the detected position of the accelerator 224 exceeds 50% of a farthest pedal position, the controller 216 controls the engine 204 to provide power to the transmission 202 that is proportional to the detected accelerator position. This zone is depicted in FIG. 2B as high power acceleration zone 4. When the position of the accelerator 224 is detected in this zone, greater power is provided to accommodate for rapid accelerations or emergency maneuvers.

In alternative embodiments, high power acceleration zone 4 can be removed. In such embodiments, when the detected position of the accelerator 224 exceeds 50% of a farthest pedal position, the controller 216 disables the HMDF driving mode and an accelerator tuning map different from FIG. 2B is used.

Figure 3A:
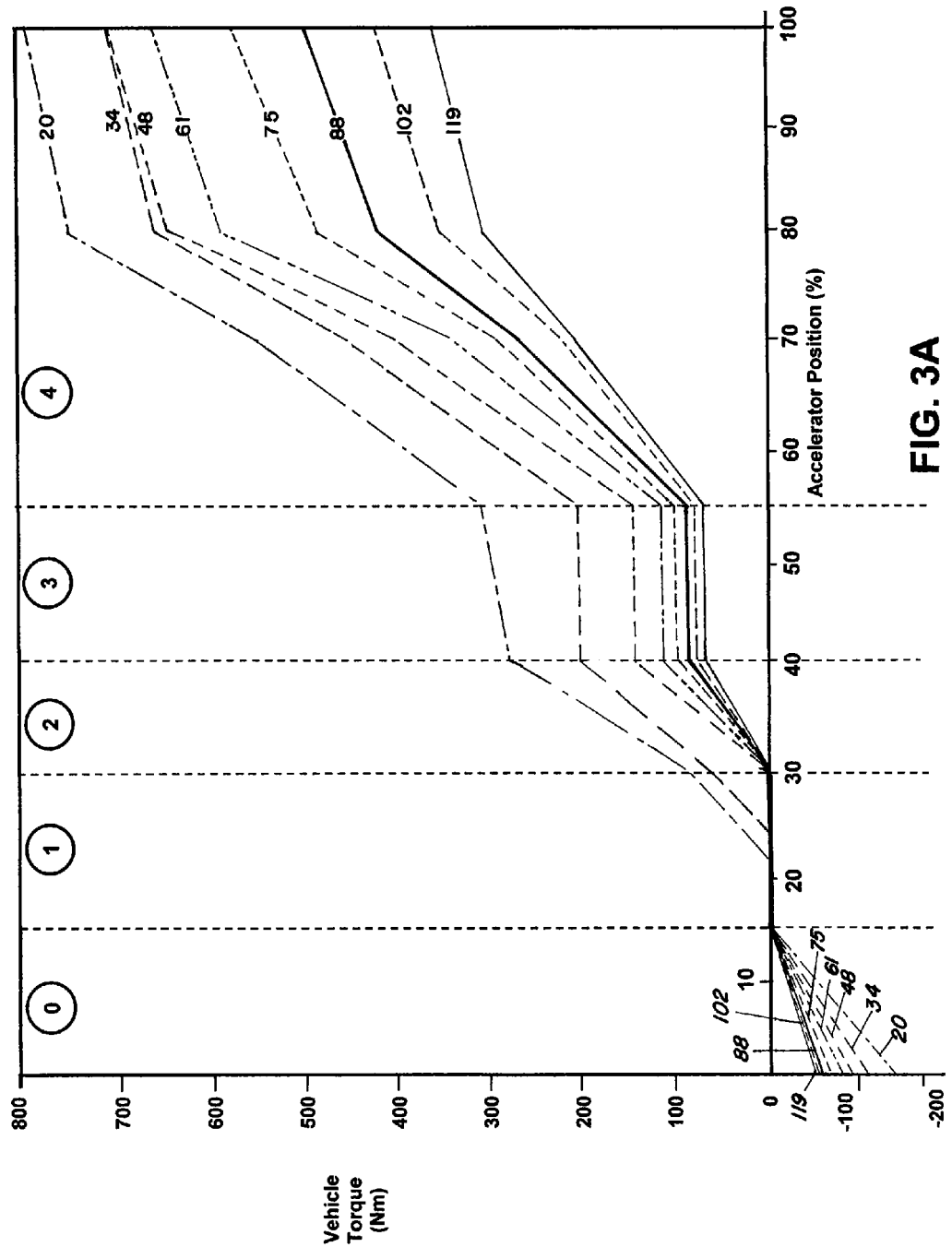
FIG. 3A is an accelerator tuning map for vehicle torque according to an embodiment of the present invention.
Figure 3B:
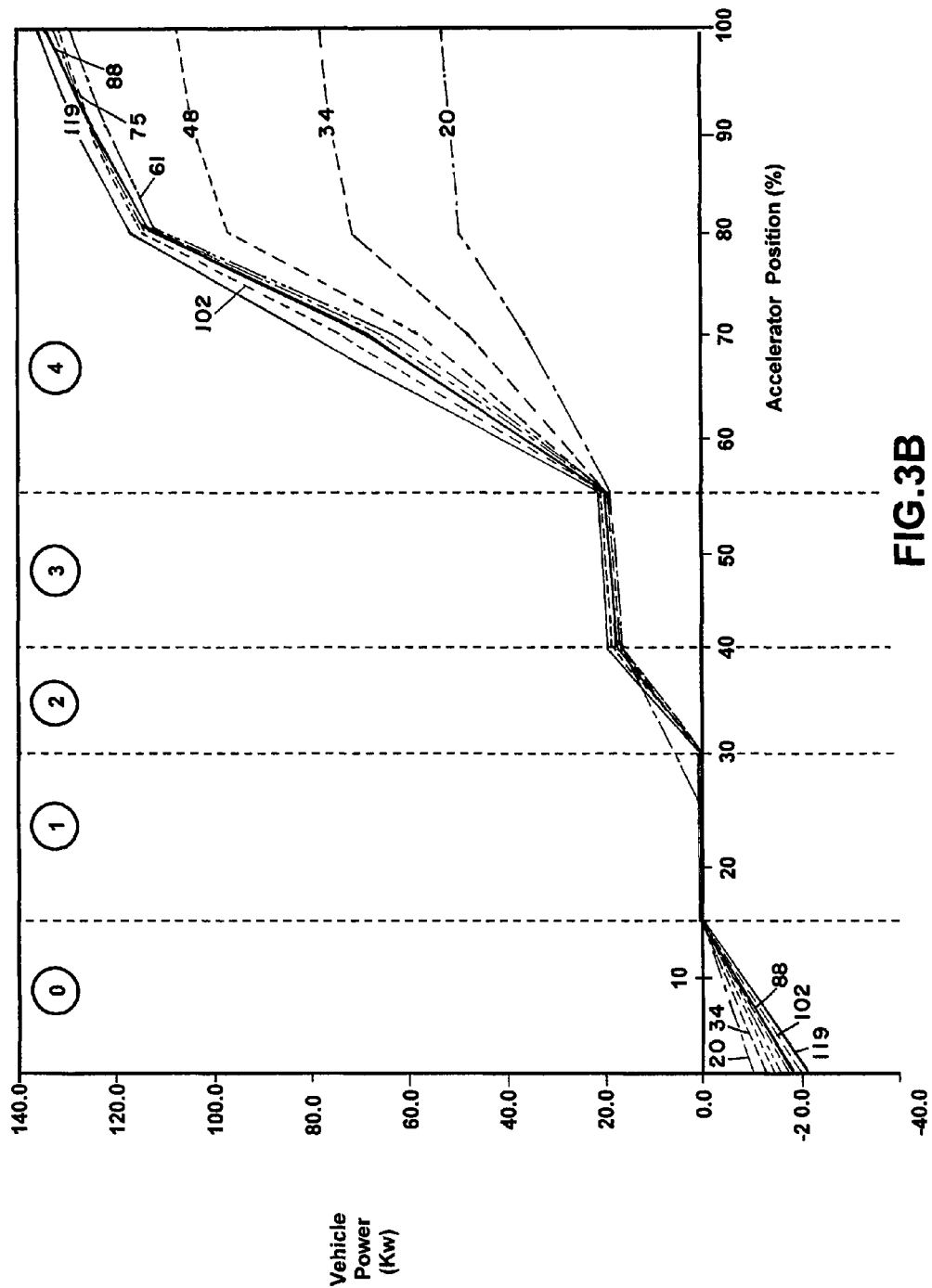
FIG. 3B is an accelerator tuning map for vehicle power according to an embodiment of the present invention.

FIGS. 3A and 3B depict accelerator tuning maps which include regeneration zone 0 where the controller 216 controls the engine 204 such that the electric motors 208 and 210 convert mechanical power from the transmission 202 into electrical power for storage in the battery unit 212. In other words, the electric motors 208 and 210 act as generators when an accelerator pedal position is detected within regeneration zone 0. As a result, negative vehicle torques are shown in the regeneration zone 0 of FIG. 3A to indicate a vehicle torque that opposes a forward direction of the vehicle 100 and ordinarily causes the vehicle 100 to decelerate in regeneration zone 0.

In comparison to the accelerator tuning map of FIG. 2A, the glide, the transition, the pulse, and the high power acceleration zones are shifted to accommodate for regeneration zone 0. The accelerator tuning map of FIG. 3A has glide zone 1 defined between a detected accelerator pedal position from 16% to 29%. Little to no torque is provided by the engine 204 in glide zone 1. Transition zone 2 is defined between a detected accelerator pedal position from 30% to 40%. Pulse zone 3 is defined between 41% and 55%, and high power acceleration zone 4 is defined beyond 55%. As with the ranges shown in FIGS. 2A and 2B, accelerator positions for these ranges can vary without departing from the spirit and scope of the present invention.

FIG. 3B illustrates an accelerator tuning map depicting vehicle power instead of vehicle torque and including regeneration zone 0. In regeneration zone 0, the electric motors 208 and 210 are controlled to convert mechanical power from the transmission 202 into electrical power for storage in the battery unit 212. Accordingly, the target vehicle powers shown in FIG. 3B are negative in regeneration zone 0 to indicate a vehicle power that opposes the forward direction for the vehicle 100. This opposing vehicle power ordinarily causes the vehicle 100 to decelerate.

As noted above, the substantially constant power or torque provided in pulse zone 3 can correspond to a relatively efficient operation point for the vehicle 100 or for the engine 204. In one embodiment, the substantially constant power or torque provided in pulse zone 3 corresponds to a relatively efficient region in a BSFC map for the internal combustion engine 206.

Figure 4:
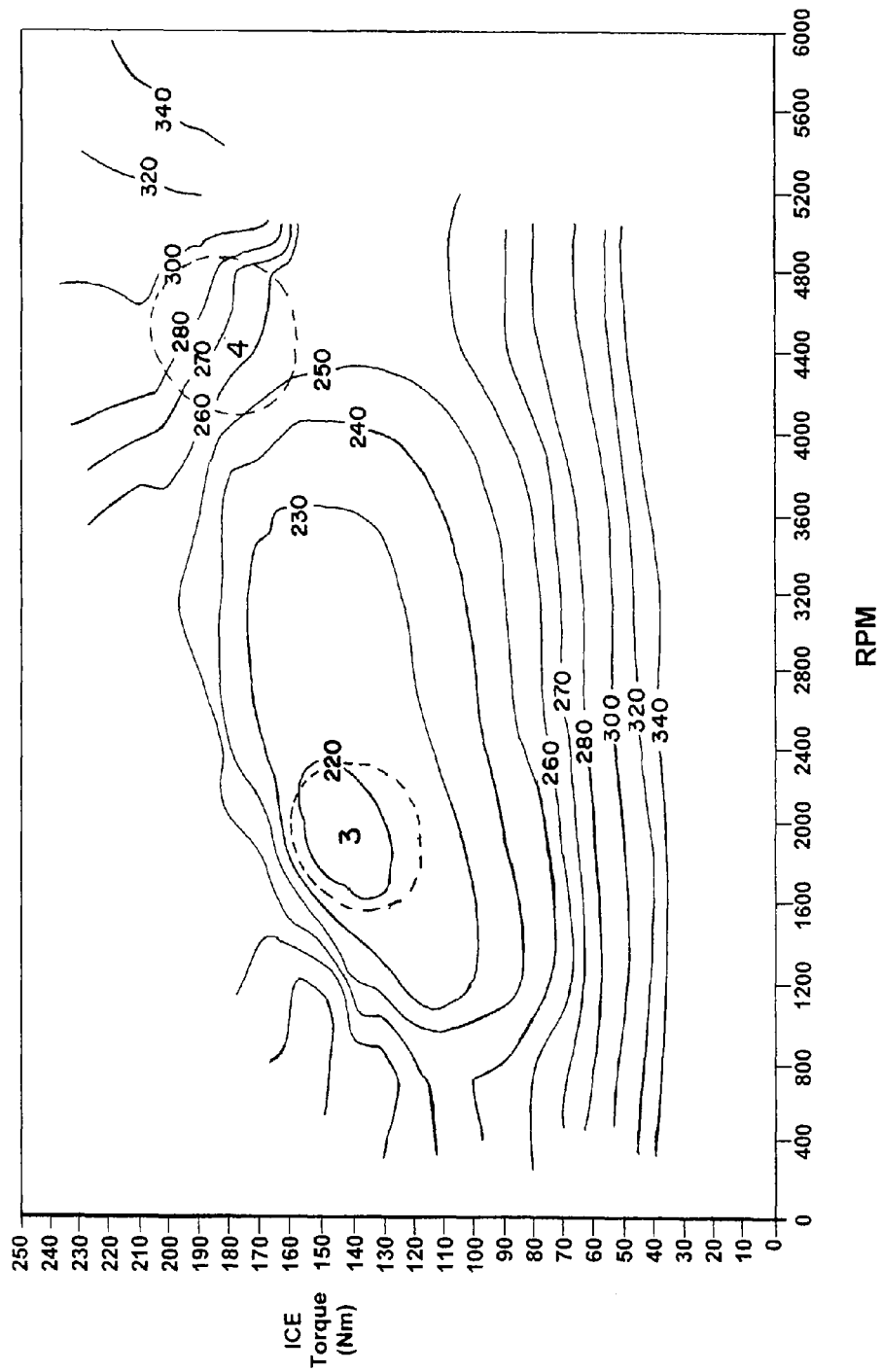
FIG. 4 is a brake specific fuel consumption (BSFC) map according to an embodiment of the present invention.

In this regard, FIG. 4 illustrates an example of a BSFC map for the internal combustion engine 206. BSFC is generally defined as the rate of fuel consumption divided by the power produced. One way of expressing BSFC mathematically is:

$$BSFC = \frac{r}{P}$$

where, r is a fuel consumption rate in grams per hour, and P is a power in kilowatts, which is provided by the internal combustion engine 206. Accordingly, lower values for BSFC indicate more efficient operating points for the internal combustion engine 206, and in the example embodiment of FIG. 4, relatively efficient operating points for the engine 204 overall.

In FIG. 4, constant BSFC plot lines are shown such as 220 grams per kilowatt hour or 240 grams per kilowatt hour. The operation of the internal combustion engine (ICE) 206 is shown for various speeds (RPM) across the x-axis and for different torques provided by the internal combustion engine 206 along the y-axis. The dashed regions notated as 3 and 4 are BSFC regions which correspond to pulse zone 3 and high power acceleration zone 4 in an accelerator tuning map. As shown by the BSFC plot lines in FIG. 4, region 3 indicates a more efficient region of the BSFC map than region 4 since the BSFC is lower for the internal combustion engine 206 when it is operating in region 3 than in region 4.

When an HMDF mode has been selected via the drive mode selector 226, the controller 216 controls the internal combustion engine 206 to operate in region 3 when the accelerator input is within a range of positions for a pulse zone in an accelerator tuning map. By operating the internal combustion engine 206 in region 3 with substantially constant power during pulse acceleration phases, the fuel economy of the vehicle 100 is ordinarily improved over basic fuel-saving driving styles.

When the accelerator sensor 222 detects the accelerator 224 within a range of positions for a high power acceleration zone in an accelerator tuning map, the controller 216 controls the internal combustion engine 206 to operate in region 4. In contrast, when the accelerator sensor 222 detects a position of the accelerator 224 within glide zone 1 of the accelerator tuning map, the controller 216 controls the internal combustion engine 206 to operate close to or at zero torque with zero or low RPM. At this point, little or no fuel is consumed by the internal combustion engine 206, which is considered off at zero torque and zero RPM in FIG. 4.

Figure 5A:
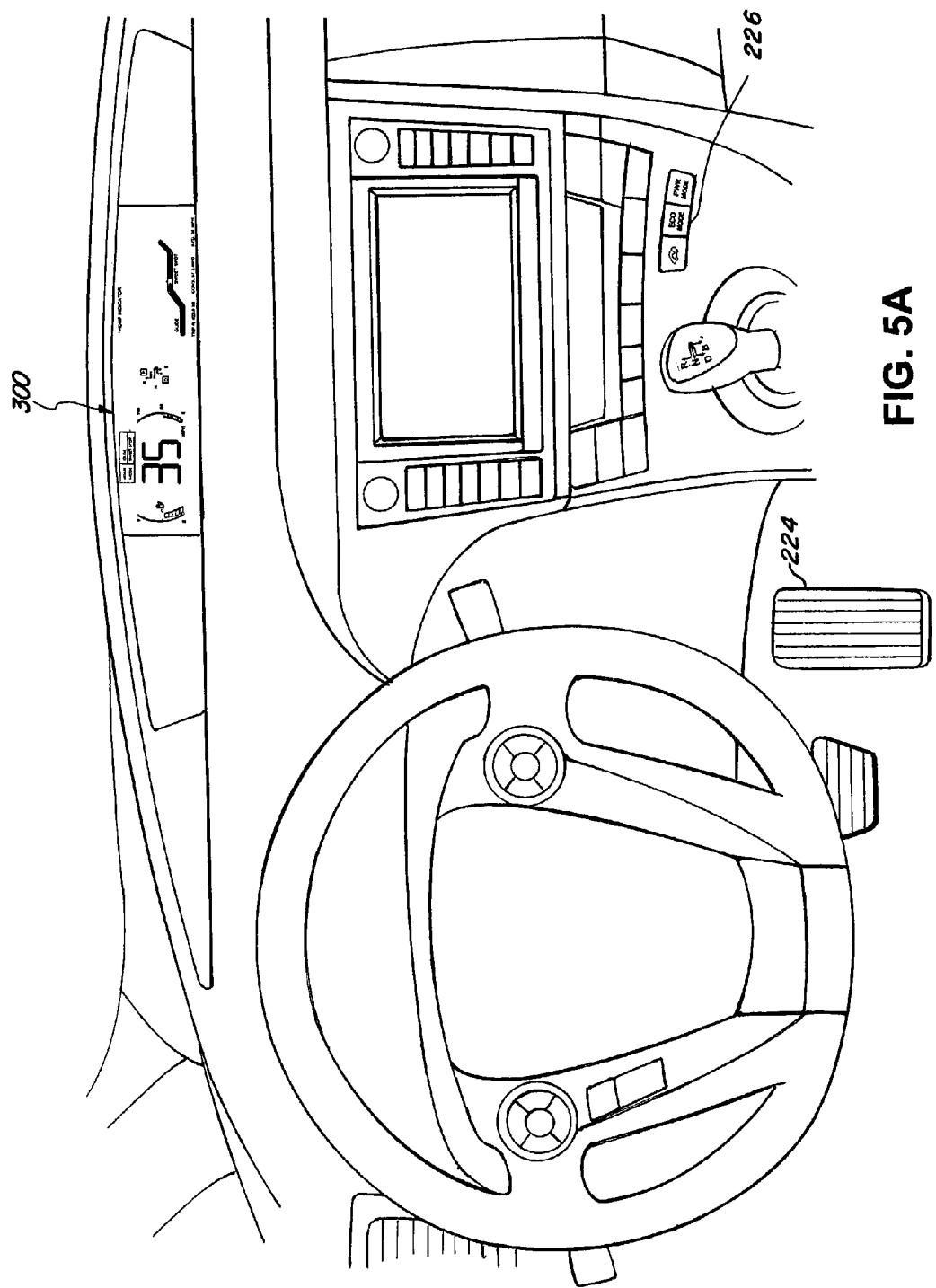
FIG. 5A is a view of a vehicle cabin according to an embodiment of the present invention.

FIG. 5A is a view of the cabin of the vehicle 100 according to an example embodiment. As shown in FIG. 5A, the cabin includes the accelerator 224, the drive mode selector 226 and the display 300. The relative locations of the drive mode selector 226 and the display 300 are not limited to the locations shown in FIG. 5A. In addition, the accelerator 224 is depicted as an accelerator pedal in FIG. 5A. In alternative embodiments, the accelerator 224 can be omitted where the accelerator sensor 222 acts as a direct interface with a driver or computer system controlling the vehicle 100.

In FIG. 5A, the drive mode selector 226 is a push button designated as "ECO MODE". In alternative embodiments, the drive mode selector 226 can be designated with other markings, such as "HMDF". The HMDF mode of the present embodiment is turned on by a driver pushing and holding the drive mode selector 226 for a designated period of time, such as for two seconds. By having a period of time for which the drive mode selector 226 is depressed, it is ordinarily possible to reduce an accidental selection of the HMDF mode. However, as will be appreciated by those of ordinary skill in the art, such a user interface feature is optional. To turn off the HMDF mode, the drive mode selector 226 can be pressed again.

Figure 5B:
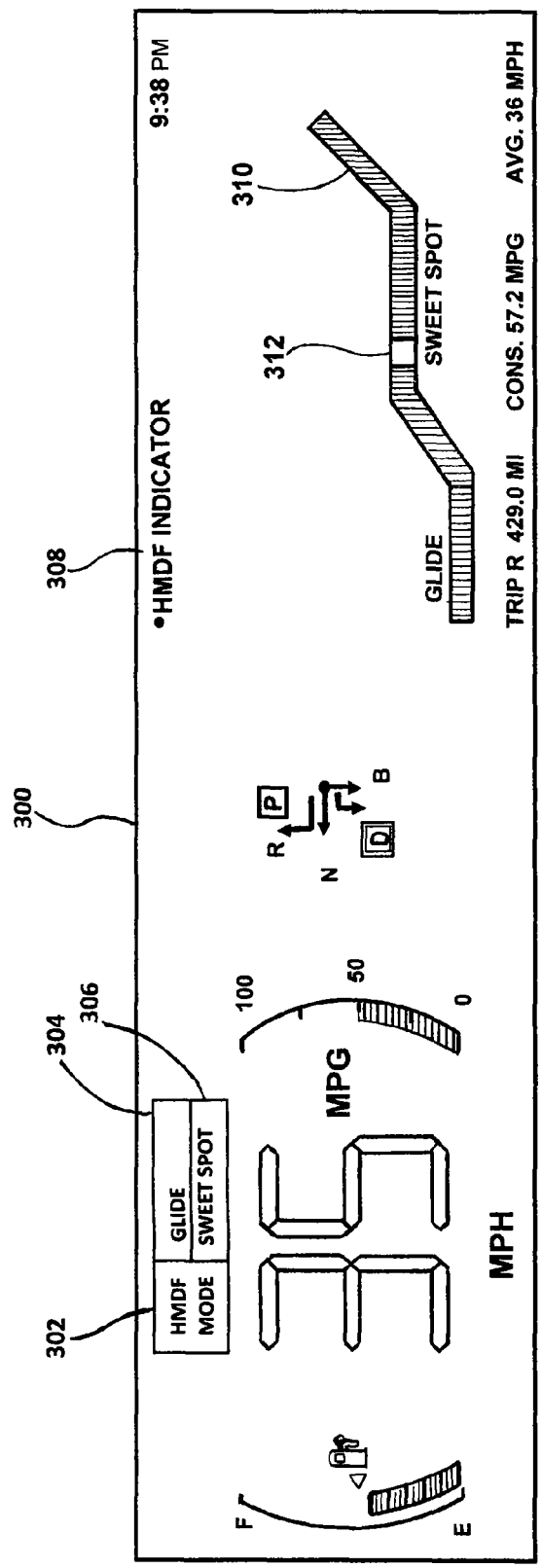
FIG. 5B is a close-up view of a display in the vehicle cabin of FIG. 5A according to an embodiment of the present invention.

FIG. 5B provides a close-up view of the display 300 which displays information for a driver when the HMDF mode has been enabled via the drive mode selector 226. The display 300 includes the mode indicator 302, the glide zone indicator 304, the pulse zone indicator 306, the HMDF indicator 308, the status bar 310, and the current zone block 312. After the HMDF mode has been enabled, the mode indicator 302 illuminates and the HMDF indicator 308, the status bar 310 and the current zone block 312 appear on the display 300.

The glide zone indicator 304 illuminates when the accelerator sensor 222 detects the accelerator input within the range of values defining the glide zone in the accelerator tuning map. In addition, the glide zone indicator 304 turns off when the accelerator sensor 222 detects the accelerator input outside of the range of values defining the glide zone.

Similarly, the pulse zone indicator 306 illuminates when the accelerator sensor 222 detects the accelerator input within the range of values defining the pulse zone. In the example embodiment of FIG. 5, the pulse zone indicator 306 indicates "SWEET SPOT" to reference the efficient operation point of the vehicle 100 or the engine 204. The pulse zone indicator 306 turns off when the accelerator sensor 222 detects the accelerator input outside of the range of values defining the pulse zone.

Additional information is provided to a driver with the status bar 310, which provides a graphical representation of the accelerator input in relation to the four zones described above. The current status block 312 moves along the status bar 310 to indicate the current location of the accelerator input, thereby providing the driver with information on whether the accelerator 224 is in a position corresponding to a glide, a transition, a pulse or a high power acceleration zone. In addition, the current status block 312 provides the driver with a sense of how close the accelerator input is to moving into a different zone, which can ordinarily allow the driver to correct the position of the accelerator 224 to reduce the chance of accidentally entering an unwanted zone.

The status bar 310 and the indicators 302, 304, 306 and 308 are only examples of graphical representations for providing information in one embodiment of an HMDF mode. As will be appreciated by those of ordinary skill in the art, various other graphical representations are possible.

Figure 6A:
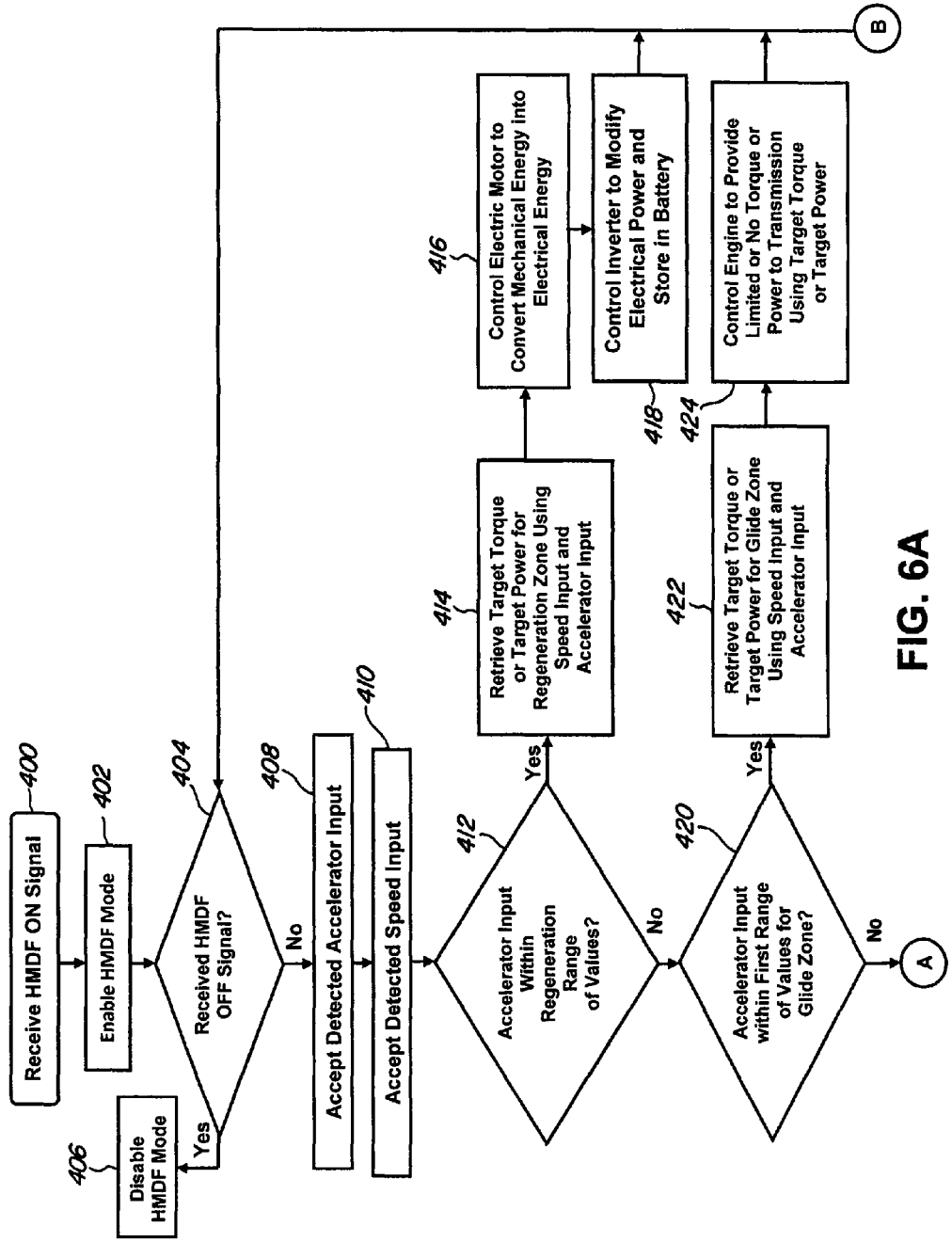
FIG. 6A is a first part of a flowchart depicting a process for providing a more efficient operation of a vehicle according to an embodiment of the present invention.
Figure 6B:
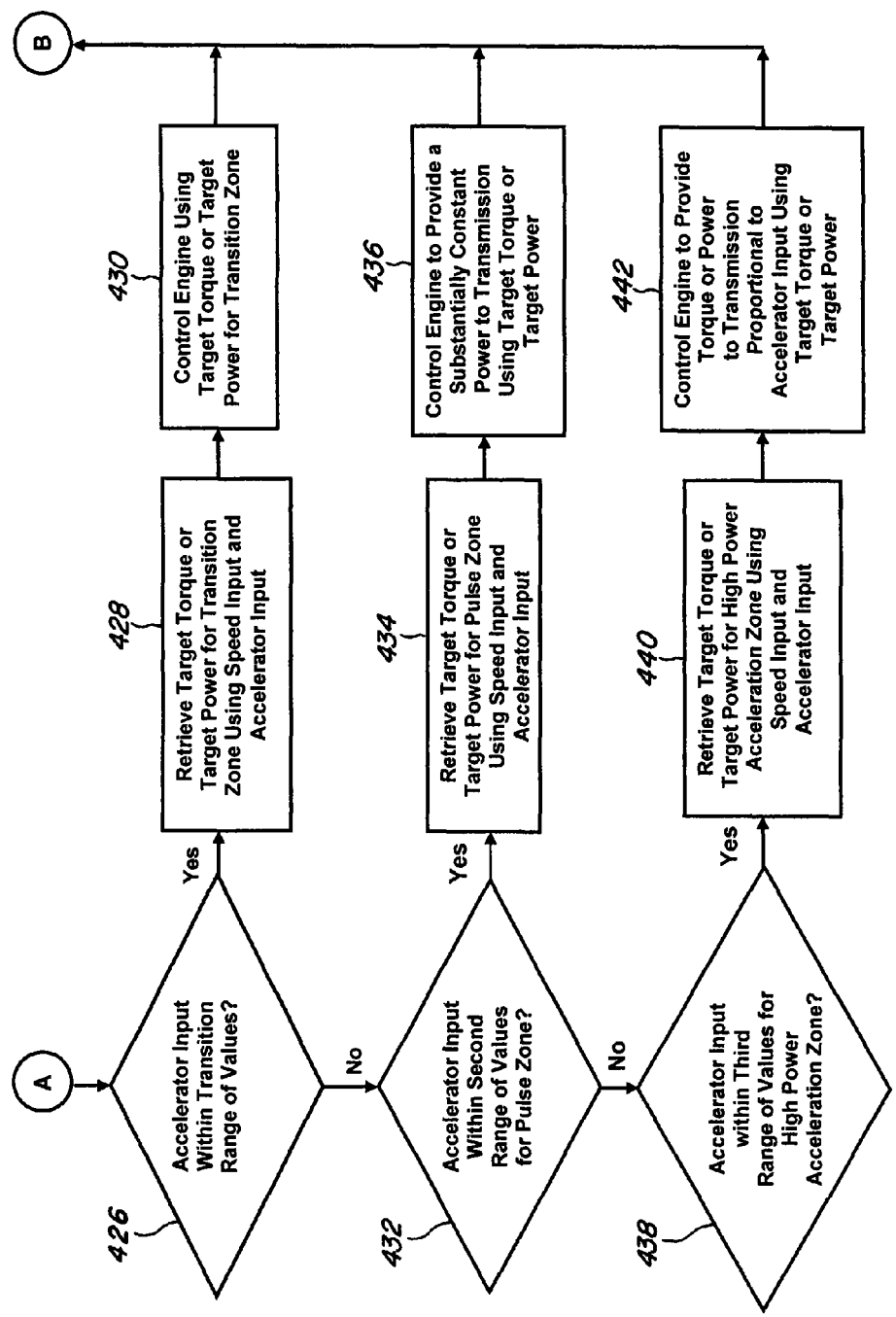
FIG. 6B is the second part of the flowchart of FIG. 6A.

FIGS. 6A and 6B comprise a flowchart depicting an example process for implementing an HMDF mode in the vehicle 100. In initial step 400, an HMDF ON signal is received by the controller 216. The HMDF ON signal can be sent, for example, as a result of the drive mode selector 226 being held down. In step 402, the processor 218 or the controller 216 enables the HMDF mode. In step 404, the processor 218 determines whether an HMDF OFF signal has been received from the drive mode selector 226. In the embodiment of FIGS. 6A and 6B, the HMDF OFF signal may come from either the drive mode selector 226 or from the vehicle 100 having been turned off. If the HMDF OFF signal has been received by the controller 216, the processor 218 disables the HMDF mode in step 406. If the HMDF OFF signal has not been received, the controller 216 accepts a detected accelerator input in step 408 from the accelerator sensor 222. In addition, the controller 216 accepts a speed input from the speed sensor 228 in step 410.

Steps 412 to 418 are optional steps which are included if the HMDF mode includes a regeneration zone. In step 412, the processor 218 determines whether the accepted accelerator input is within a regeneration range of values. If so, a target torque or target power is retrieved in step 414 by the processor 218 from the memory 220. More specifically, a target torque or target power is retrieved by the processor 218 using the accelerator input accepted in step 408, the speed input accepted in step 410 and an accelerator tuning map stored in the memory 220. In step 416, the processor 218 controls the engine 204 such that the internal combustion engine 206 provides limited or no torque or power while the electric motors 208 and 210 convert mechanical power from the transmission 202 into electrical power. In step 418, the processor 218 controls the inverter box 214 to modify the converted electrical power and store it in the battery unit 212. The process then returns to step 404 to determine whether an HMDF OFF signal has been received by the controller 216.

If the processor 218 determines that the accelerator input is not within the regeneration range of values in step 412, the process proceeds to step 420. The processor 218 determines whether the accepted accelerator input is within a first range of values in step 420. The first range of values corresponds to a glide zone of an accelerator tuning map stored in the memory 220. If the accelerator input is within the first range of values, the processor 218 retrieves a target torque or target power in step 422 by using the accelerator input accepted in step 408, the speed input accepted in step 410 and the accelerator tuning map. In step 424, the processor 218 controls the engine 204 to provide limited or no torque or power to the transmission 202 using the target torque or target power retrieved in step 422. Such control can be achieved by operating the engine 204 in a very low power state or by turning off the engine 204. The process then returns to step 404 to determine if an HMDF OFF signal has been received.

If the processor 218 determines that the accelerator input is not within the first range of values in step 420, the process continues to step 426 where the processor 218 determines whether the accelerator input is within a transition range of values corresponding to a transition zone, such as transition zone 2 in FIG. 3A. If so, in step 428, the processor 218 retrieves a target torque or target power from the memory 220 corresponding to the accepted accelerator input and the accepted speed input for the transition zone of the accelerator tuning map. As discussed above, the target torque or target power for the transition zone is proportional to the accepted accelerator input. In step 430, the processor 218 controls the engine 204 using the retrieved target torque or target power for the transition zone. The process then returns to step 404 to determine whether an HMDF OFF signal has been received by the controller 216.

If the processor 218 determines in step 426 that the accepted accelerator input is not within the transition range of values, the process proceeds to step 432 to determine whether the accelerator input is within a second range of values corresponding to a pulse zone in an accelerator tuning map stored in the memory 220. If so, in step 434, the processor 218 retrieves a target torque or target power from the memory 220 corresponding to the accepted accelerator input and the accepted speed input for the pulse zone. In step 436, the processor 218 controls the engine 204 to provide a substantially constant power for the pulse zone using the retrieved target torque or target power. The process then returns to step 404 to determine whether an HMDF OFF signal has been received by the controller 216.

If the processor 218 determines in step 432 that the accepted accelerator input is not within the second range of values, the process proceeds to step 438 to determine whether the accelerator input is within a third range of values corresponding to a high power acceleration zone in an accelerator tuning map stored in the memory 220. If the accelerator input is within the third range of values, a target torque or target power is retrieved in step 440 by the processor 218 from the memory 220 using the accepted accelerator input from step 408 and the accepted speed input from step 410. The target torque or target power for the high power acceleration zone is proportional to the accepted accelerator input. The processor 218 then controls the engine 204 in step 442 to provide the target torque or the target power to the transmission 202.

In alternative embodiments, steps 440 and 442 can be removed and the HMDF mode can be disabled if the accepted accelerator input is within the third range of values.

In the embodiment of FIG. 6B, the process returns to step 404 after step 442 to determine whether an HMDF OFF signal has been received by the controller 216. As noted above, when an HMDF OFF signal is received by the controller 216, the processor 218 disables the HMDF mode in step 406 and the process ends.

Figure 7:
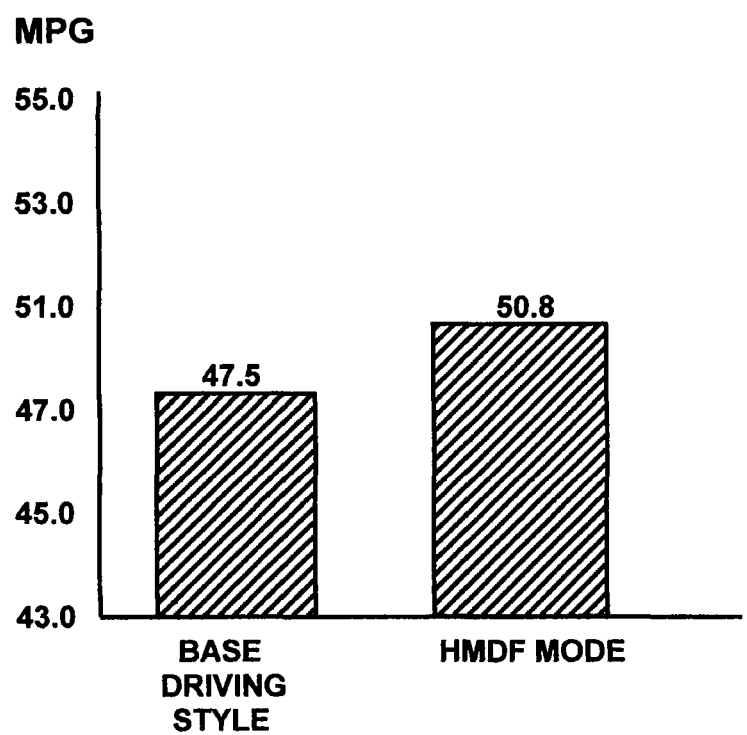
FIG. 7 is a bar graph illustrating results from a test drive of a vehicle incorporating an embodiment of the present invention.

FIG. 7 is a bar graph illustrating results from a thirty-six mile test drive of a hybrid vehicle incorporating an embodiment of the present invention. The test course included several different types of driving conditions including freeway driving and various types of city roads having a variety of traffic patterns. As shown in FIG. 7, a base driving style including light accelerations and smooth decelerations resulted in an average fuel economy of 47.5 miles per gallon while driving with an HMDF mode of the present disclosure resulted in an average fuel economy of 50.8 miles per gallon. This difference in fuel economy accounts for approximately a 7% improvement in fuel economy over the base driving style.

Those of ordinary skill will appreciate that the various illustrative logical blocks and process steps described in connection with the examples disclosed herein may be implemented as electronic hardware, computer software, or combinations of both. Whether such functionality is implemented as hardware or software depends upon the particular application and design constraints imposed on the overall system. Ordinarily skilled artisans may implement the described functionality in varying ways for each particular application, but such implementation decisions should not be interpreted as causing a departure from the scope of the disclosed apparatus and methods.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the present invention. Various modifications to these examples will be readily apparent to those of ordinary skill in the art, and the principles disclosed herein may be applied to other examples without departing from the spirit or scope of the present invention. The described embodiments are to be considered in all respects only as illustrative and not restrictive and the scope of the invention is, therefore, indicated by the following claims rather than by the foregoing description. All changes which come within the meaning and range of equivalency of the claims are to be embraced within their scope.

What is claimed is:

1. A drive force system for facilitating a more efficient operation of a vehicle using pulsing and gliding of the vehicle, the drive force system comprising:
   an engine configured to provide power to move the vehicle;
   a transmission operatively coupled to the engine;
   an accelerator sensor configured to detect an accelerator input; and
   a controller connected to the accelerator sensor and the engine,
   wherein the controller is configured to accept the accelerator input and control the engine to provide limited or no power to the transmission in a glide state when the accelerator input is within a first range of values and automatically control the engine to provide a substantially constant power to the transmission in a pulse state or a constant power state when the accelerator input is within a second range of values that is greater than the first range of values, and
   wherein the controller is configured to transition between the glide state and the pulse state or the constant power state based on the accelerator input for improving energy efficiency of the vehicle.

2. The drive force system of claim 1, wherein the substantially constant power provided by the engine corresponds to a relatively efficient operation point for the vehicle or the engine.

3. The drive force system of claim 1, wherein the engine comprises an internal combustion engine and the substantially constant power provided by the engine corresponds to a relatively efficient region in a brake specific fuel consumption map for the internal combustion engine.

4. The drive force system of claim 1, wherein the controller is further configured to control the engine to provide power to the transmission that is proportional to the accelerator input when the accelerator input is within a third range of values.

5. The drive force system of claim 1, wherein the accelerator input corresponds to a pedal position.

6. The drive force system of claim 5, wherein the first range of values corresponds to pedal positions within a range of approximately zero to twenty percent of a farthest pedal position, and the second range of values corresponds to pedal positions within a range of approximately thirty to fifty percent of a farthest pedal position.

7. The drive force system of claim 1, wherein the controller is configured to provide an increasing power in a transition mode to transition from providing the limited or no power in the glide state to providing the substantially constant power in the pulse state or the constant power state when the accelerator input increases from the first range of values to a fourth range of values,
   wherein the fourth range of values is greater than the first range of values and less than the second range of values.

8. The drive force system of claim 5, wherein the controller is further configured to control the engine to provide power proportional to the accelerator input when the accelerator input is within a third range of values which corresponds to pedal positions within a range of approximately fifty to one hundred percent of a farthest pedal position.

9. The drive force system of claim 1, wherein the engine includes an electric motor and the controller is further configured to control the electric motor to convert mechanical energy into electrical energy when the accelerator input is within a regeneration range of values.

10. A method of providing a more efficient operation of a vehicle using pulsing and gliding of the vehicle, the method comprising:
   detecting an accelerator input from an accelerator sensor;
   determining whether the accelerator input is within a first range of values or within a second range of values that is greater than the first range of values;
   controlling an engine to provide limited or no power to a transmission in a glide state when it is determined that the accelerator input is within the first range of values and automatically controlling the engine to provide a substantially constant power to the transmission in a pulse state or a constant power state when it is determined that the accelerator input is within the second range of values; and transitioning between the glide state and the pulse state or the constant power state based on the accelerator input for improving energy efficiency of the vehicle.

11. The method of claim 10, wherein the substantially constant power provided by the engine corresponds to a relatively efficient operation point for the vehicle or the engine.

12. The method of claim 10, wherein the engine comprises an internal combustion engine and the substantially constant power provided by the engine corresponds to a relatively efficient region in a brake specific fuel consumption map for the internal combustion engine.

13. The method of claim 10, further comprising:
determining whether the accelerator input is within a third range of values; and
controlling the engine to provide power to the transmission that is proportional to the accelerator input when it is determined that the accelerator input is within the third range of values.

14. The method of claim 10, wherein the accelerator input corresponds to a pedal position.

15. The method of claim 14, wherein the first range of values corresponds to pedal positions within a range of approximately zero to twenty percent of a farthest pedal position.

16. The method of claim 14, wherein the second range of values corresponds to pedal positions within a range of approximately thirty to fifty percent of a farthest pedal position.

17. The method of claim 14, further comprising:
determining whether the accelerator input is within a third range of values which corresponds pedal positions within a range of approximately fifty to one hundred percent of a farthest pedal position; and
controlling the engine to provide power to the transmission that is proportional to the accelerator input when the accelerator input is within the third range of values.

18. The method of claim 10, wherein the engine includes an electric motor and the method further comprises controlling the electric motor to convert mechanical energy into electrical energy when the accelerator input is within a regeneration range of values.

19. A controller for providing a more efficient operation of a vehicle using pulsing and gliding of the vehicle, the controller comprising:
a computer-readable memory configured to store computer-executable process steps; and
a processor configured to execute the computer-executable process steps stored in the memory, wherein the process steps include computer-executable process steps to:
accept an accelerator input from an accelerator sensor;
determine whether the accelerator input is within a first range of values or within a second range of values that is greater than the first range of values; and
control an engine to provide limited or no power to a transmission in a glide state when it is determined that the accelerator input is within the first range of values and automatically control the engine to provide a substantially constant power to the transmission in a pulse state or a constant power state when it is determined that the accelerator input is within the second range of values
wherein the controller is configured to transition between the glide state and the pulse state or the constant power state based on the accelerator input for improving energy efficiency of the vehicle.

20. The controller of claim 19, wherein the substantially constant power provided by the engine corresponds to a relatively efficient operation point for the vehicle or the engine.

* * * * *